ELECTRON MEANS FOR GENERATING TRIGONOMETRIC FUNCTIONS

Filed July 2, 1957 4 Sheets-Sheet 1

Aug. 7, 1962 R. T. BYERLY 3,048,337

ELECTRON MEANS FOR GENERATING TRIGONOMETRIC FUNCTIONS

Filed July 2, 1957 4 Sheets-Sheet 3

Aug. 7, 1962 R. T. BYERLY 3,048,337

ELECTRON MEANS FOR GENERATING TRIGONOMETRIC FUNCTIONS

Filed July 2, 1957 4 Sheets-Sheet 4

United States Patent Office 3,048,337

Patented Aug. 7, 1962

3,048,337

ELECTRON MEANS FOR GENERATING TRIGONOMETRIC FUNCTIONS

Richard T. Byerly, Wilkins Township, Allegheny County, Pa., assignor to Westinghouse Electric Corporation, East Pittsburgh, Pa., a corporation of Pennsylvania Filed July 2, 1957, Ser. No. 669,549

3 Claims. (Cl. 235—186)

This invention relates to an electronic means for generating trigonometric functions and more particularly to a circuit arrangement of high gain amplifiers capable of producing an output, a magnitude of which varies as the trigonometric function of a control input.

Some previous methods for developing trigonometric functions of dependent variables involved the positioning of a rotating shaft for varying the positions of a variable tap along a potentiometer, the resistance of which is constructed to have a trigonometric function such as sine or cosine. The rotating shaft is usually operated by servo-mechanisms of computing type. This method of generating trigonometric functions is of fairly good static quality but falls short of the dynamic desirabilities due to the physical limitations of the positioning system. The actual inertia of the mechanical components limits the speed of response to an undesirable slow rate. In addition, the potentiometer being generally a wire wound type of device provides a stepped output rather than a smooth continuous output from minimum to maximum limits.

It is therefore an object of this invention to provide an electronic circuit for generating trigonometric functions.

It is another object of this invention to provide an electronic circuit capable of developing trigonometric functions that are free from minute voltage steps in varying from maximum to minimum limits or vice versa.

It is another object of this invention to provide an electronic circuit for generating trigonometric functions that is free from output delay that is caused by mechanical inertia.

It is another object of this invention to provide an electronic circuit for generating trigonometric functions that is capable of providing infinite output voltage values between the maximum and minimum voltage limitations.

Other objects, purposes and characteristic features will become apparent as a description of the invention progresses.

In practicing this invention, there is provided high gain amplifiers having voltage limit means for regulating the output of the amplifier circuit to maximum values of the voltage limit means above and below zero. The amplifier for the circuit is provided with a plurality of inputs, one of which acts as a reference voltage and which is variable as a trigonometric function rate such as the sine. The two inputs, when combined at the amplifier, cause the output voltage of the amplifier to be alternately positive and negative for periods established by a comparison of the two input voltages. The output voltage of the amplifiers is then filtered and appears as a direct voltage, the amplitude of which varies as the trigonometric function of one of the input voltages.

In each of the several views, similar parts bear like reference characters.

Figure 1:
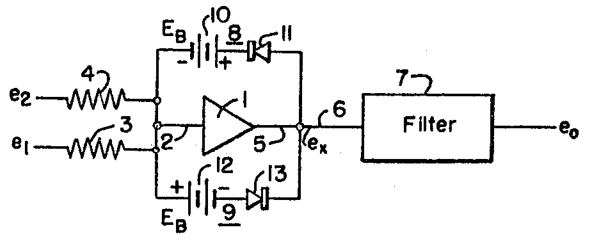
FIGURE 1 is a view of a circuit capable of generating a trigonometric function.

The circuit shown in FIG. 1 is a circuit capable of developing an output voltage, the magnitude of which is variable as a function of an input reference voltage and an input control voltage. The input reference voltage is preferably of a pure sine wave form which might be represented as $E_m \sin \omega t$, where $E_m$ represents the maximum peak voltage of the sine wave reference voltage. This voltage will be designated as $e_2$. The control voltage is basically a direct current voltage. However, it may vary in amplitude but at a rate far less than the rate of variation of the reference voltage $e_2$. The direct current control voltage is for the purpose of simplification designated $e_1$. The range of $e_1$ must be such that $-E_m \leqq e_1 \leqq E_m$.

The circuit of FIG. 1 comprises an amplifier which is preferably of high gain characteristics and which may have a gain as high as one-hundred million. The exact construction of FIG. 1 is not shown in this invention since any suitable high gain type of amplifier can be used.

Amplifier 1 is provided with an input circuit 2 connected to the input voltage sources $e_1$ and $e_2$ through the resistors 3 and 4 respectively. The resistors 3 and 4 generally are of approximately equal value, however under certain circumstances, involving the use of this circuit these resistors may be of unequal values as is necessary.

Amplifier 1 is provided with an output circuit 5 connected to the input circuit 6 of a suitable filter 7, the exact structure of which is not shown since it is not essential to this invention.

In order to provide both positive and negative voltage limits for amplifier 1, a pair of feedback or limiting circuits 8 and 9 connecting the output circuit 5 of amplifier 1 to the input circuit 2 of amplifier 1 is provided. The feedback or limiting circuit 8 comprises a battery 10 and rectifier 11 connected in series, with the negative terminal of the battery 10 being connected to the input circuit 2 of the amplifier 1. Likewise, the feedback or limiter circuit 9 comprises a battery 12 and rectifier 13 connected in series, with the positive terminal of the battery connected to the input circuit 2 of amplifier 1.

With the application of voltages $e_1$ and $e_2$ to the input circuit 2 of amplifier 1, the amplifier will attempt to provide an output proportional to the combined input. When the output voltage, whether it be positive or negative, reaches the value of the voltage of one of the feedback or limiting circuits 8 or 9, the feedback circuit then becomes a feedback path which limits the output voltage to the level of the battery voltage found in the corresponding feedback path. For example, if we assume that the combined voltages $e_1$ and $e_2$ provides a positive input to the amplifier 1, the output voltage will rise negatively until the voltage is equal to the voltage of the D.C. source or battery 12, since this is the only feedback path through which current due to the output voltage can pass, due to the rectifier 13 allowing passage and the rectifier 11 blocking passage of this polarity voltage. When the output voltage equals the voltage of the battery 12, the battery then becomes a low resistance path between the output circuit 5 of the amplifier 1 and the input circuit 2, thus causing the amplifier output voltage to be limited to the value of the feedback battery voltage 12.

It should be pointed out, that in order for the feedback voltage to be in a proper phase relationship to limit the output voltage to the voltages $E_B$ of the battery voltages 10 and 12, it is necessary for the amplifier 1 to also phase shift its output 180°. Without the phase shift, the feedback voltage merely tends to cause unstable characteristics in the circuit shown.

Figure 2:
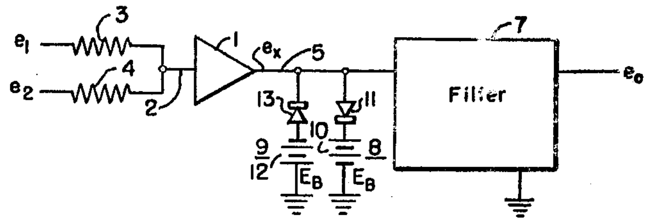
FIG. 2 is a view of circuit similar to FIG. 1 that is capable of developing trigonometric functions.
Figure 3:
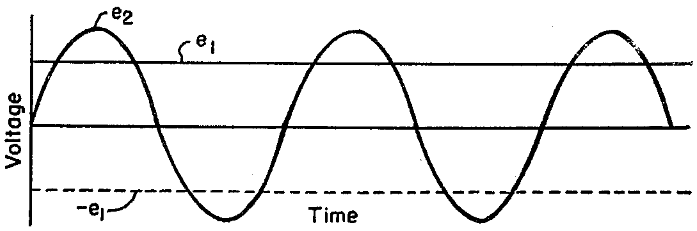
FIG. 3 is a curve representing typical input voltages for the circuits of FIGS. 1 and 2.
Figure 4:
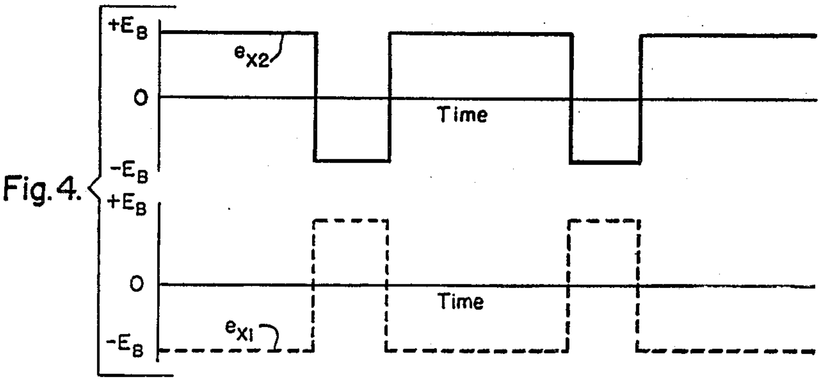
FIG. 4 is a curve representing the output voltages of the amplifiers of FIGS. 1 and 2 prior to being filtered.

The curve shown in FIG. 4 represents a typical output curve of the voltage $e_{x1}$ and $e_{x2}$ due to the input voltages $e_1$ and $e_2$ of FIG. 3 being applied to the circuits of FIGS. 1 and 2. It can be seen that if we combine the input voltages $e_1$ and $e_2$ and apply them to the amplifier 1 of FIG. 1 that as long as the combined voltages result in a value greater than zero and with a phase reversal taking place in the amplifier 1, the output voltage of $e_{x1}$ will maintain a $-E_B$ value of battery 12 until the reference voltage $e_2$ when combined with the control voltage $e_1$ arrives at a total input voltage to the amplifier of slightly less than zero. At this time, as the combined input voltages $e_1$ and $e_2$ start to go negative, the amplifier 1 produces a positive output voltage of $E_B$ value. As long as the combined voltages $e_1$ and $e_2$ produce a negative input voltage to the amplifier 1, the output voltages $e_{x1}$ will maintain the $E_B$ value. However, as soon as the reference voltage $e_2$ starts to rise and rises to a point capable of producing a resultant positive input voltage to the amplifier 1, the output $e_{x1}$ of amplifier 1 very rapidly moves from the positive $E_B$ value to a negative $E_B$ value. This operation continues as long as the two inputs $e_1$ and $e_2$ are applied to the amplifier 1.

It should be pointed out that although the wave form of $e_{x1}$ shown in FIG. 4 is shown as a square wave, it is true that the vertical lines between the $+E_B$ and $-E_B$ values actually follow lines that are proportional to the curve of the negative voltage $e_2$. Since the amplifier 1 is a high gain device, the $E_B$ values are generally very small in comparison to the input times the gain of the amplifier and thus for all practical purposes the time period taken for the amplifier to reverse its output from $+E_B$ to $-E_B$ or vice versa is of extremely small duration in comparison to the time that the voltage is maintained at the $E_B$ levels.

Figure 5:
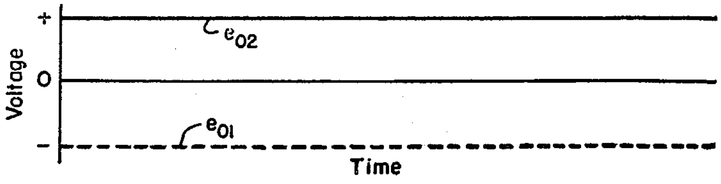
FIG. 5 is a curve representing the output voltages that could be found at the output terminals of filters of FIGS. 1 and 2.

The square wave voltage $e_{x1}$ is then passed into the filter 7 and results in an output voltage from the filter 7 of a value $e_{01}$ represented by the output voltage $e_{01}$ of FIG. 5. The magnitude of $e_{01}$ is established by the algebraic sum of the positive and negative portions of the wave form shown in FIG. 4. For example, the area of the square wave found above the zero line of FIG. 4 is substantially less than the area of area found below the zero line thus resulting in a negative $e_{01}$ value for FIG. 1. The circuit of FIG. 1 is capable of producing an $e_{01}$ voltage equal to $$\frac{-2E_B}{\pi}\left[\sin^{-1}\frac{e_1}{E_m}\right]$$

With the foregoing description of the device of FIGURE 1 and its operation, the relationship between $e_{01}$ and $e_1$ can be obtained by analysis. It is to be stated that the voltage $e_1$ represents the sine of an angle $\theta_1$ which is assumed to lie in the first or fourth quadrant, the scale of the voltage being such that $$\sin\theta_1=-\frac{e_1}{E_m}$$

where $\theta_1$ is measured in radians. This scale relationship is indicated to be negative as a convenience to compensate for phase reversal in the amplifier of FIGURE 1. Thus, positive values of $e_1$ correspond to fourth quadrant values of $\theta_1$, and negative values of $e_1$ correspond to first quadrant values of $\theta_1$.

Figure 12:
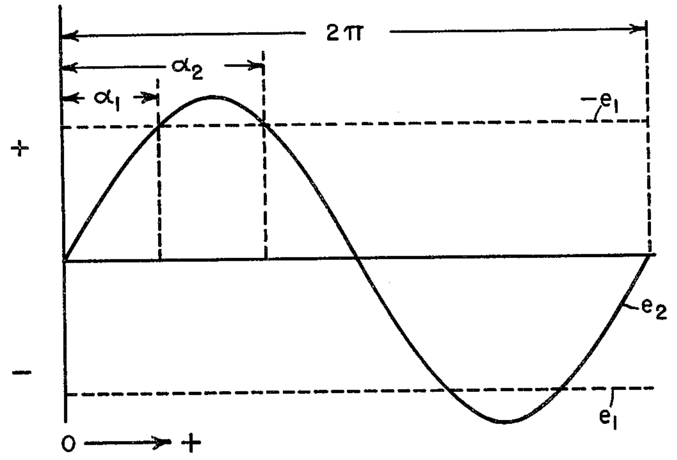
FIG. 12 is a graphical representation showing the points at which output switching will occur in the circuit of FIG. 1 when the input control voltage is positive in polarity.

Consider now only values of $\theta_1$ in the first quadrant for which $e_1$ will be negative. The corresponding switching diagram for one cycle of the sinusoid is shown in FIGURE 12. The value of $e_x$ will be $$e_x=+E_B \text{ from } 0 \text{ to } \alpha_1$$
$$e_x=-E_B \text{ from } \alpha_1 \text{ to } \alpha_2$$
$$e_x=+E_B \text{ from } \alpha_2 \text{ to } 2\pi$$

Thus the value of $e_{01}$ will be $$e_{01}=\frac{E_B(\alpha_1)-E_B(\alpha_2-\alpha_1)+E_B(2\pi-\alpha_2)}{2\pi}$$

Note that $$\alpha_1=\pi-\alpha_2$$

Then substituting for $\alpha_2$, $$e_{01}=\frac{E_B(\alpha_1)-E_B(\pi-2\alpha_1)+E_B(2\pi-\pi+\alpha_1)}{2\pi}$$

$$e_{01}=\frac{2E_B}{\pi}(\alpha_1)$$

But it is apparent that if $e_1$ represents the sine of an angle $\theta_1$ in the first quadrant such that $$e_1=-E_m\sin\theta_1$$

when switching occurs, then with $e_1$ negative (as assumed) $\theta_1$ is identically equal to $\alpha_1$. Hence $$e_{01}=\frac{2E_B}{\pi}(\theta_1)$$

or $$\theta_1=\frac{\pi}{2E_B}e_{01}$$

Figure 13:
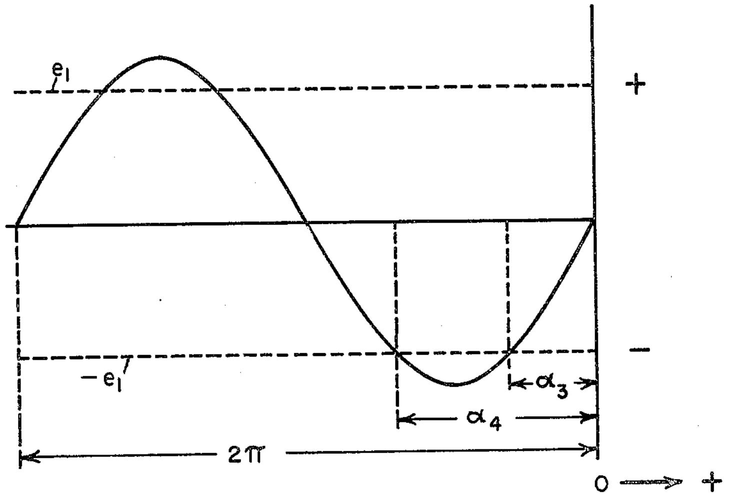
FIG. 13 is a graphical representation showing the points at which output switching will occur for the circuit of FIG. 1 when the input control voltage is negative in polarity.

Now consider the angle $\theta_1$ to lie in the fourth quadrant, specifying $\theta_1$ numerically as $$-\pi_2\leqq\theta_1\leqq 0$$

with $e_1$ positive. The switching diagram is as shown in FIGURE 13. The reference for angular measurement has been shifted to avoid a more complicated notation. The values of $e_x$ are given as $$e_x=-E_B \text{ from } -2\pi \text{ to } -\alpha_4$$
$$e_x=+E_B \textit{ from } -\alpha_4 \text{ to } \alpha_3$$
$$e_x=-E_B \text{ from } -\alpha_3 \text{ to } 0$$

Hence $$e_{01}=\frac{-E_B(2\pi-\alpha_4)+E_B(\alpha_4-\alpha_3)-E_B(\alpha_3)}{2\pi}$$

also $$\alpha_3=\pi-\alpha_4$$
$$\alpha_4=\pi-\alpha_3$$

Substituting for $\alpha_4$ $$e_{01}=\frac{-E_B(2\pi-\pi+\alpha_3)+E_B(\pi-2\alpha_3)-E_B(\alpha_3)}{2\pi}$$

$$e_{01}=\frac{-2E_B}{\pi}(\alpha_3)$$

As before, since switching occurs at a point $$-e_1=E_m\sin\theta_1$$

where $e_1$ is positive and $\theta_1$ is in the fourth quadrant, $\theta_1$ is identical to $(-\alpha_3)$. Therefore, $$e_{01}=\frac{2E_B}{\pi}(\theta_1)$$

Thus, the circuit of FIGURE 1 is established as being an arcsin device operating in the first and fourth quadrants. In general, if $e_1+e_2>0$, then $e_{x1}$ would be equal to $-E_B$, if $e_1+e_2<0$, then $e_{x1}$ would be equal to $+E_B$. This relationship holds true as long as there is a phase reversal in amplifier 1 and an associated feedback path.

The circuit of FIG. 2 is similar to that of FIG. 1 with the exception that the limiting voltage sources $E_B$ are now placed in the output circuit of the amplifier 1 in such a manner as to act as an output limiting device and not as a feedback limiter. With this arrangement, it is unnecessary to provide a phase reversal in amplifier 1. As pointed out previously, the phase reversal in the amplifier of FIG. 1 was necessary to provide the proper phase relationship between the input voltage and the feedback voltage. The limiting circuits 8 and 9 in FIG. 2 provide high resistance for any output voltage on output circuit 5 of amplifier 1 until the battery voltage $E_B$ of the proper limiting path 8 or 9 is exceeded. At this time, the limiting path becomes a low resistance path to ground for any attempted increase in voltage above the value of the battery voltage $E_B$.

If we again take a look at FIGS. 3, 4 and 5 while considering the circuit arrangement of FIG. 2, we can see that FIG. 3 discloses the input voltages to the balancing resistors 3 and 4 of FIG. 2 in a manner identical with that of FIG. 1. The combined input voltages are then applied to the input circuit 2 for the amplifier 1 then suitably amplified and applied to the output circuit 5 as an amplified signal. Since the amplifier 1 is again a high gain type of amplifier, the output voltage $e_{x2}$ can be assumed to have risen positively to a value equal to the voltage $+E_B$ of the proper limiting path. Since no phase reversal has taken place in amplifier 1, the output voltage $e_{x2}$ will appear at the maximum level of $+E_B$ with the rectifier 11 and battery source 10 acting as a shunt path of low resistance for any voltage above the battery 10 voltage $+E_B$. In a manner similar to the circuit of FIG. 1, the output voltage $e_{x2}$ remains at the $+E_B$ value until the reference voltage $e_2$ goes sufficiently negative to make the resultant combined input voltages appear as a zero or slightly negative input to the amplifier 1. At this time, the output of the amplifier 1 moves rapidly to the $-E_B$ value to remain at this level through the action of the current limiting path 9 until the reference voltage $e_2$ again rises to a point capable of allowing a slightly positive input voltage to amplifier 1.

The output voltage $e_{02}$ is as previously pointed out, the average value of the $+E_B$ and $-E_B$ values described by the output voltage curve $e_{x2}$. This value is shown in FIG. 5.

Figure 6:
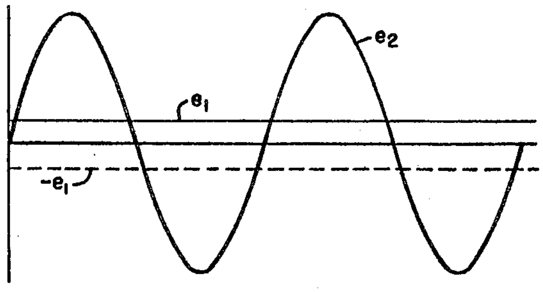
FIG. 6 is a curve of still different magnitude voltages typical of those capable of being the input to the circuits of FIGS. 1 and 2.
Figure 7:
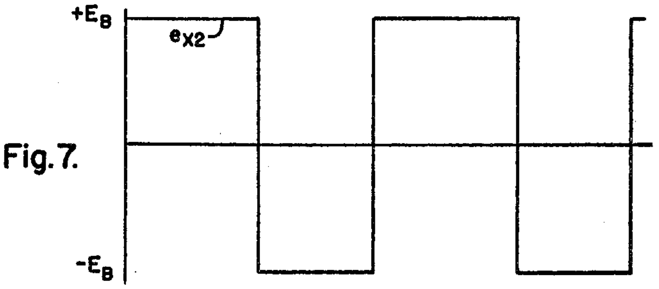
FIG. 7 is a curve representing an output voltage of the amplifier prior to filtering of FIG. 2.
Figure 8:
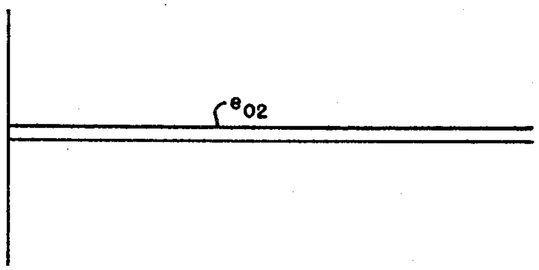
FIG. 8 is a curve of the output voltage of the filter of FIG. 2 resulting from the input voltages of FIG. 6.

In order to show how the output voltage $e_{02}$ can vary as a function of the two input voltages $e_1$ and $e_2$, the curves of FIGS. 6, 7 and 8 are shown. If we again assume that the reference voltage $e_2$ is again applied to the input circuit 2 of the amplifier 1, and that the control voltage $e_1$ of far less value is applied to the input circuit 2 of the amplifier 1, the output voltage $e_{x2}$ again being limited to maximum values of $+E_B$ and $-E_B$ would be represented by the voltage curve $e_{x2}$ shown in FIG. 7. It is pointed out, however, that the length of time that the output voltage of the amplifier 1 remains positive is much shorter, and the length of time that the voltage remains negative is much longer, than the voltage curve shown in FIG. 4. For this reason, when the output voltage $e_{x2}$ is passed through the filter 7, a filter output voltage $e_{02}$ is greatly reduced as a function of the input control voltage $e_1$.

It should be clear that an infinite number of values for $e_{02}$ can be obtained with a circuit of this nature without the introduction of stepped voltages.

Figure 9:
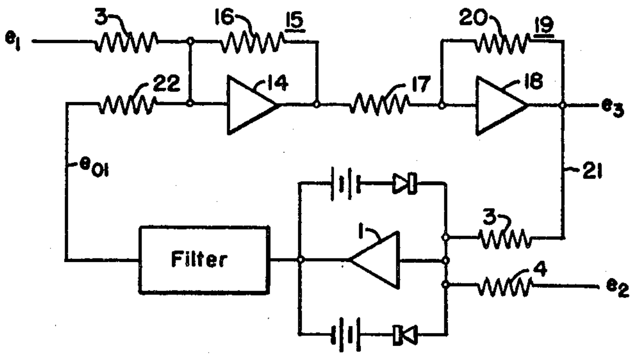
FIG. 9 is a view of a circuit capable of developing the sine function of an input control voltage.

The circuit shown by FIG. 9 is one employing a closed loop feedback circuit of high gain degenerative nature. This circuit is capable of operation over a range merely from $$\frac{-\pi}{2}, 0, \frac{+\pi}{2} \text{ radians}$$

In this circuit the incoming control voltage $e_1$ is applied to an amplifier 14 provided with a resistance feedback circuit 15 including the resistor 16. The value of the resistor 16 determines the amount of gain in the operation of the amplifier 14. This gain may be set at any value desired or found necessary for the particular system in which this circuit may be used. For the sake of clarity, we will assume that the resistor 16 allows a high gain within the amplifier 14. The input control voltage $e_1$ is therefore applied to the input of the amplifier 14 in combination with a feedback voltage, the value of which will be explained hereinafter. If we assume that the input voltage to amplifier 14 is applied and results in an output voltage, this voltage is applied through a resistor 17 to the input of an amplifier 18. Amplifier 18 is identical with the amplifier 14 in that the amplifier is provided with a suitable feedback circuit 19 provided with a resistor 20. The feedback circuit 20 also establishes the output of amplifier 18 in a manner similar to that described in connection with amplifier 14.

Amplifiers 14 and 18 when used with a feedback or limiting circuit must also provide for a phase reversal in order to allow the feedback voltage to be in the proper phase relationship to act as an establishing voltage. It is pointed out that although the feedback circuit is shown as using a resistor, the circuit could utilize other impedance devices such as capacitors.

It should also be pointed out that an amplifier not having a feedback circuit (such as shown in FIG. 2) can be used. However, the feedback circuit is preferable due to the increased stability in the amplifier output. The use of feedback controlled amplifiers dictates the use of a series of two such amplifiers since it is necessary to cause two phase reversals between the input and the output of the system for proper phase output.

The output of amplifier 18 results in an output voltage $e_3$ which is applied through a feedback resistor 3 to a feedback circuit that is identical in configuration and function with that described in connection with FIG. 1. Since this circuit is identical with FIG. 1, it is also necessary to provide an input reference voltage $e_2$ in a manner similar to FIG. 1. The output voltage of this feedback circuit therefore can be designated as $e_{01}$ since it is identical in character with the output voltage previously described in connection with FIG. 1. Since the output voltage $e_{01}$ of the feedback circuit is a trigonometric function, as previously described, of the control voltage $e_3$ applied to feedback amplifier 1, through the feedback circuit 21 and since a phase reversal takes place in the feedback amplifier 1, the voltage $e_{01}$ applied through the resistor 22 acts as a degenerative voltage to the input voltage $e_1$.

This closed loop circuit then becomes stable when the feedback voltage $e_{01}$ matches the input control voltage $e_1$ as modified by the resistors 3 and 22 before application to the amplifier 14. Under normal conditions, the resistors 3 and 22 would probably be of similar resistance value, however, depending upon the circuit application in a system, the resistance values may be varied to suit the particular application.

In FIGURE 9, the voltage $e_3$ is the same in nature as the voltage $e_1$ in FIGURE 1, that is, it is proportional to the sine of an angle in the first or fourth quadrant. Since $e_2$ is an appropriate sinusoid, $e_{01}$ is an angle $\theta$ in the first or fourth quadrant. But the nature of the degenerative feedback causes $e_1$ and $e_{01}$ of FIGURE 9 to be in very close agreement. Therefore, $e_1$ may be interpreted as an angle $\theta$ and $e_3$ as the sine of that angle, the angle being retricted to the range $-\pi/2$ to $+\pi/2$.

Figure 10:
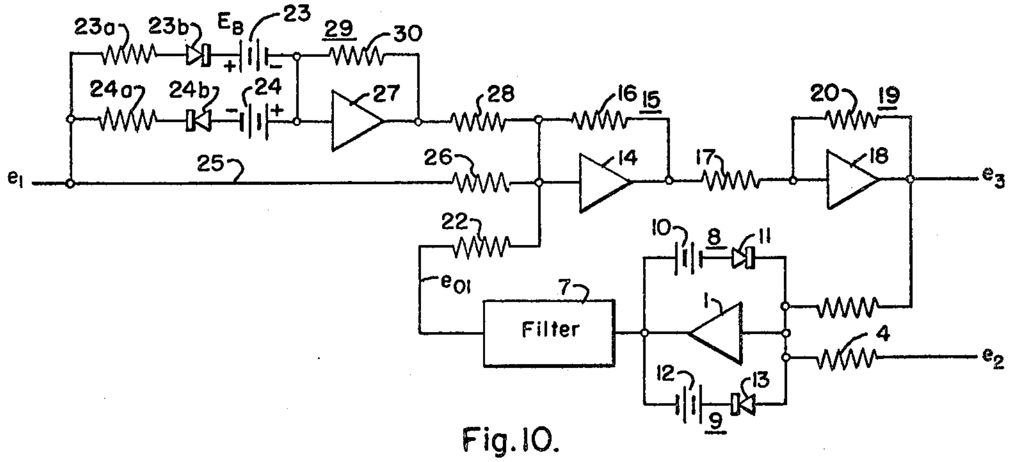
FIG. 10 is a view of a circuit capable of developing the sine function of an input voltage over a greater range than the circuit of FIG. 9.

The modification shown in FIG. 10 is similar to the circuit shown in FIG. 9, with the exception that the input circuit to the amplifier 14 is provided with circuitry capable of allowing operation over a greater range. The range in the case of the circuit shown in FIG. 10 can be represented as $$\frac{-3\pi}{2}, 0, \frac{+3\pi}{2} \text{ radians}$$

In other words, the range of this circuit is three times that of the circuit shown in FIG. 9. The greater range can best be explained by taking an input control voltage of different levels assuming that the input control voltage starts at zero. In the range from zero to the value plus or minus $E_B$ established by the batteries 23 and 24 depending upon the polarity of the applied $e_1$ voltage, the voltage is applied directly through the conductor 25 and resistor 26 to the input of amplifier 14. The input voltage is also applied through the resistors 23a and 24a to the rectifiers 23b and 24b one of which allows passage of the input voltage to the battery 23 or 24 depending upon the input voltage polarity. Since the input voltage magnitude is less than $E_B$ battery voltage this input path is blocked. As the value of $e_1$ is raised, however, to a point above the $E_B$ level, an input appears on the amplifier 27 to be amplified and applied to the amplifier 14 through the resistor 28. In this case, the amplifier 27 is provided with a feedback loop 29 provided with a resistor 30 capable of adjusting the gain in the amplifier 27. The value of this resistor is established to provide a dsirable gain of 2. This amplification of the incoming signal is then applied in parallel with the incoming signal through the resistors 28 and 26 respectively to the input of the amplifier 14. The remainder of the circuit of FIG. 10 is identical with that of FIG. 9 and the respective parts bear identical reference numerals. It should be pointed out however, that the feedback voltage $e_{01}$ applied through the resistor 22 to the input of the amplifier 14 again adjusts the output voltage $e_3$ to a value established when the feedack voltage matches the input control voltages received from the resistors 26 and 28.

Figure 11:
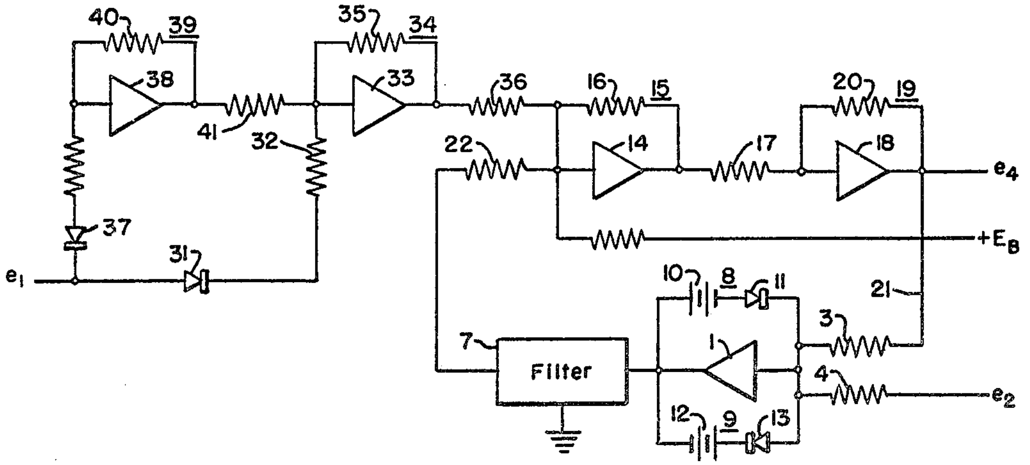
FIG. 11 is a view of a circuit capable of developing the cosine function of an input voltage to the circuit.

The circuit of FIG. 11 is used to generate the cosine of an input voltage rather than the sine as previously shown in the previous modifications. In this circuit, the basic control circuit starting with amplifier 14 is identical with that described in connection with FIGS. 9 and 10. However, the input control voltage $e_1$ is applied to the input of amplifier 14 through additional circuitry capable of effectively multiplying the positive input control voltage $e_1$ by $-1$. For example, if we assume that the input control voltage $e_1$ is a positive voltage, it can be seen that rectifier 31 would allow conduction of the input voltage through the resistor 32 to the input of an amplifier 33 capable of phase reversal as well as amplification. The amplifier 33 is provided with feedback loop path 34 including a gain resistor 35 adjusted to a gain figure in this case necessarily a gain of one. Since a phase reversal takes place in the amplifier 33, the output voltage of the amplifier is negative and applied through the matching resistor 36 to the input circuit of the amplifier 14.

If the input control voltage $e_1$ had been of negative polarity, then conduction would occur through the rectifier 37 allowing an input to the amplifier 38 also capable of phase reversal action. The amplifier 38 is also provided with a feedback loop 39 provided with a gain resistor 40 again adjusted to a gain of one. The amplifier output voltage of the amplifier 38 is a positive output voltage, due to the phase reversal in amplifier 38, which is then fed through a limiting resistor 41 to the input terminal of the amplifier 33. Amplifier 33 again amplifies the signal and provides another phase reversal and applies it to the amplifier 14. Since the control voltage $e_1$ always results in a negative voltage before being applied to the input of the amplifier 14, it is necessary to provide a second reference voltage to the input of amplifier 14. This input reference voltage is a positive voltage and in this instance preferably of $E_B$ value. For this reason when the applied voltage $e_1$ is zero the output voltage $e_4$ is at a maximum positive value. As the applied voltage $e_1$ rises positively or negatively the output voltage $e_4$ reduces as a cosine function of the applied voltage.

As previously pointed out in connection with FIGS. 9 and 10, the input voltage to the amplifier 14 is amplified by the amplifiers 14 and 18 and appears as voltage $e_4$ which in turn is fed back as an input into the feedback circuit through the amplifier 1 to modify the input control voltage in a degenerative manner to establish the desired output level of the cosine voltage $e_4$ of the input control voltage $e_1$.

It is again emphasized that in order for the output voltage of the amplifier 33 of FIG. 11 to be the same whether the input voltage $e_1$ is positive or negative the gain of amplifiers 33 and 38 must be one.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. An electronic circuit for generating trigonometric functions comprising amplifier means having an input circuit and an output circuit; means for connecting a control voltage to said input circuit; and feedback means connecting said output circuit to said amplifier means to limit any output of said amplifier means to a value established by said feedback means; said feedback means comprising a feedback amplifier operably connected to amplify the output from said output circuit and reverse the phase thereof, means for connecting a varying reference voltage to said feedback amplifier, and filter means for connecting the output from said feedback amplifier to said amplifier means; said input circuit including circuit means for feeding the control voltage directly to said amplifier means, and input amplifier means in parallel circuit relationship with said circuit means for amplifying the control voltage twice upon said control voltage exceeding a predetermined value and reversing the phase of said amplified control voltage to oppose the application of the control voltage to said amplifier means.

2. An electronic circuit for generating trigonometric functions comprising amplifier means having an input circuit and an output circuit; means for connecting a control voltage to said input circuit; and feedback means, including means for connecting a varying reference voltage to said feedback means, connecting said output circuit to said amplifier means to limit any output from said amplifier means to a value established by said feedback means; said input circuit including circuit means for feeding the control voltage directly to said amplifier means, and input amplifier means connected in parallel circuit relationship to said circuit means, said input amplifier means comprising an input amplifier having a gain of two for amplifying the control voltage, polarized voltage means connected in series circuit relationship with said input amplifier for blocking the application of the control voltage to said input amplifier until said control voltage exceeds a predetermined value; said input amplifier including phase shifting means for reversing the phase of said amplified control voltage to oppose the application of the control voltage to said amplifier means.

3. An electronic circuit for generating trigonometric functions comprising amplifier means having an input circuit and an output circuit; means for connecting a control voltage to said input circuit; and feedback means, including means for connecting a varying reference voltage of the form $E_{max} \sin \omega t$ to said feedback means, connecting said output circuit to said amplifier means to limit any output from said amplifier means to a value established by said feedback means; said input circuit including circuit means for feeding the control voltage directly to said amplifier means, and input amplifier means connected in parallel circuit relationship to said circuit means, said input amplifier means comprising an input amplifier having a gain of two for amplifying the control voltage, polarized voltage means connected in series circuit relationship with said input amplifier for blocking the application of the control voltage to said input amplifier until said control voltage exceeds a predetermined value; said input amplifier including phase shifting means for reversing the phase of said amplified control voltage to oppose the application of the control voltage to said amplifier means.

References Cited in the file of this patent

UNITED STATES PATENTS

| | | |
|---|---|---|
| 2,652,194 | Hirsch | Sept. 15, 1953 |
| 2,710,348 | Baum et al. | June 7, 1955 |
| 2,748,278 | Smith | May 29, 1956 |
| 2,849,181 | Lehmann | Aug. 26, 1958 |

OTHER REFERENCES

A Palimpsest on the Electronic Analog Art (Paynter), 1955, page 107.

Diode Limiters Simulate Mechanical Phenomena by Morrill and Baum, pp. 122 to 126, Electronics. November 1952.